INVENTOR.
Karl John Wahlborg
BY Edmund A. [illegible]
his ATTORNEY

INVENTOR.
Karl John Wahlborg
BY
his ATTORNEY

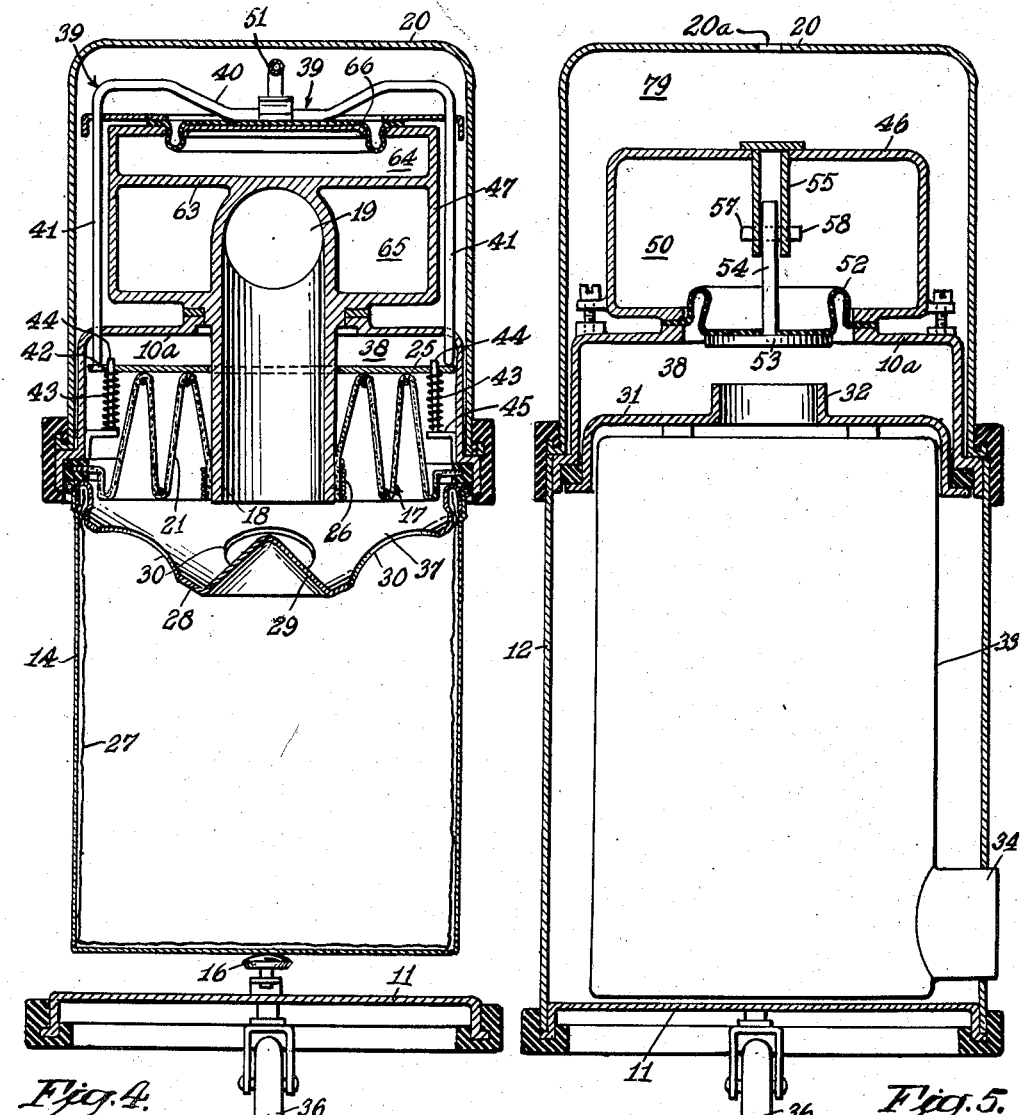
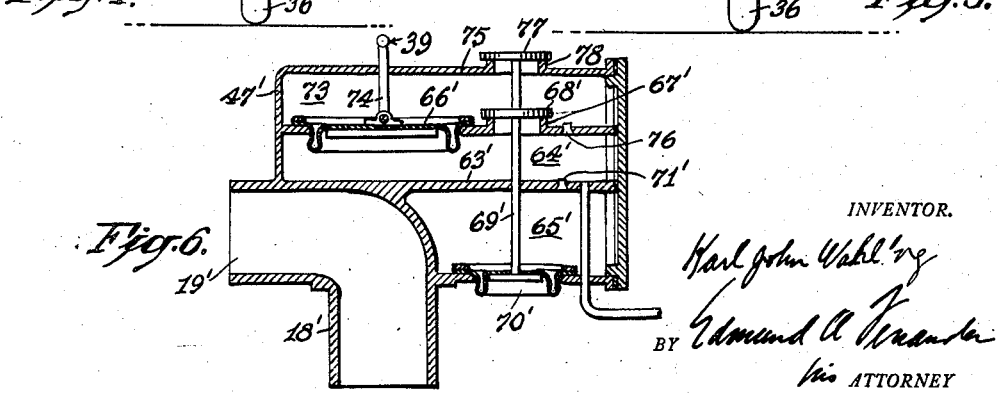

United States Patent Office 2,842,225
Patented July 8, 1958

2,842,225

AUTOMATIC MEANS FOR SHAKING SUCTION CLEANER FILTERS

Karl John Wahlborg, Bromma, Sweden, assignor to Aktiebolaget Elektrolux, Stockholm, Sweden, a corporation of Sweden Continuation of application Serial No. 398,395, December 15, 1953. This application March 5, 1957, Serial No. 644,095

Claims priority, application Sweden December 20, 1952

17 Claims. (Cl. 183—37)

My invention relates to suction cleaners of the type that employ a dust separating member which tends to become clogged with dust and dirt separated from air. This application is a continuation of my application Serial No. 398,395, filed December 15, 1953, now abandoned.

It is an object of my invention to provide an improvement for automatically suspending the normal operation of such a suction cleaner and imparting movement to the dust separating member to dislodge dust and dirt therefrom.

Another object is to provide such an improvement for automatically resuming normal operation of the cleaner after dislodging dust and dirt from the dust separating member.

A further object is to provide such an improvement for automatically imparting movement to the dust separating member responsive to an operating condition which reduces the efficiency of the cleaner.

A still further object is to provide such an improvement for automatically imparting movement to the dust separating member responsive to such an operating condition which occurs when the dust separating member becomes clogged with dust and dirt.

In accord with the invention I accomplish this by providing fluid operated mechanism for automatically shaking a suction cleaner filter element responsive to removal of dust and dirt from the air by such filter element. More particularly, the mechanism includes provisions for effecting operation thereof responsive to a predetermined pressure differential at opposite sides of the filter element. Further, the suction effect developed by the motor fan unit of the cleaner is employed to initiate operation of the filter shaking mechanism and subsequently terminate the operation of such mechanism.

The above and other objects and advantages of my invention will become apparent as the following description proceeds, and the features of novelty which characterize the invention will be pointed out with particularity in the claims annexed to and forming a part of this specification.

For a better understanding of my invention, reference may be had to the following description taken in connection with the accompanying drawings in which.

Figure 1:
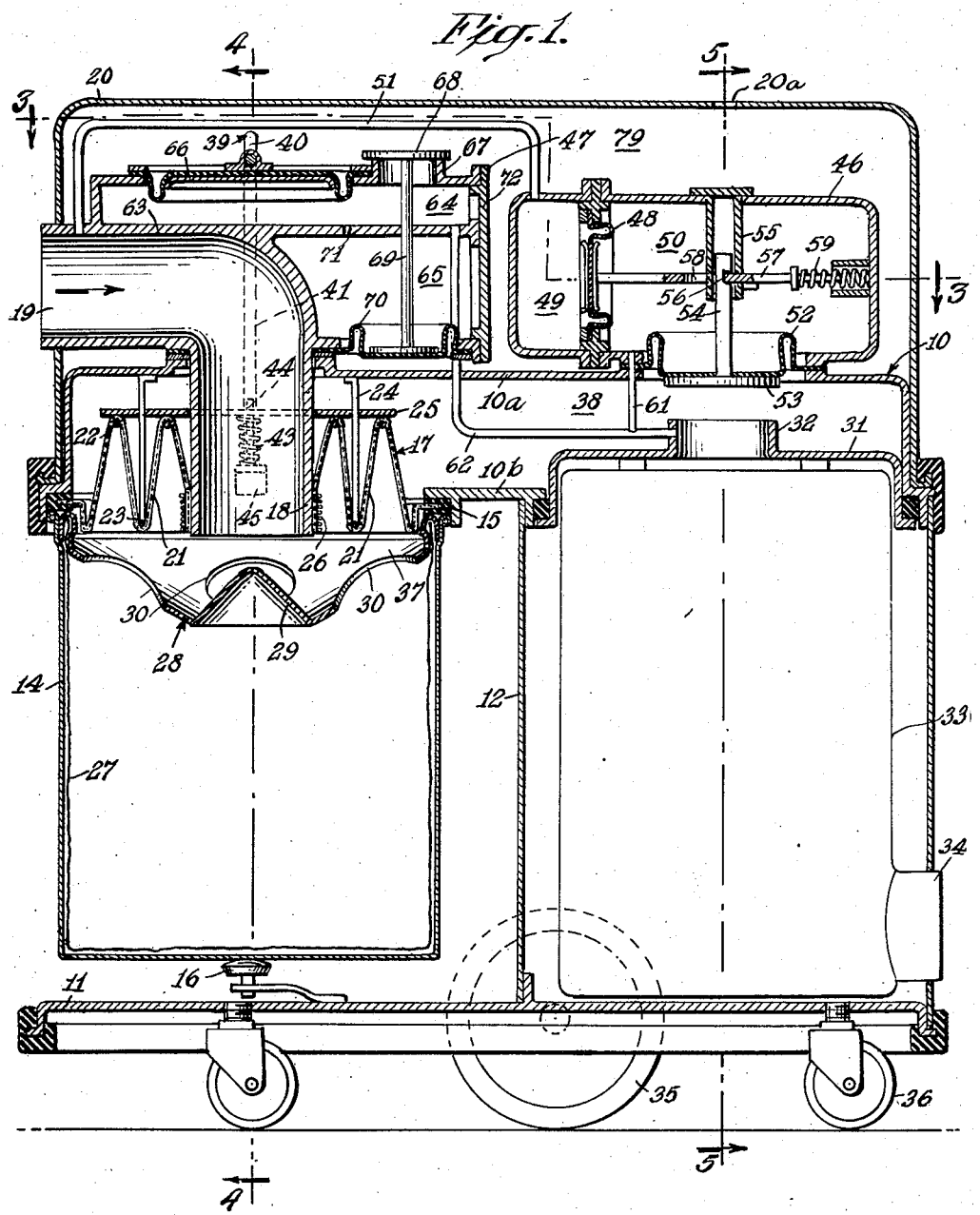
Fig. 1 is a vertical sectional view of a suction cleaner embodying my invention.

Figs. 4 and 5 are vertical sectional views taken at lines 4—4 and 5—5, respectively, of Fig. 1; and Fig. 6 is a fragmentary sectional view of parts of a suction cleaner like that shown in Figs. 1 to 5 illustrating another embodiment of the invention.

Referring to Fig. 1, the suction cleaner which I have shown embodying my invention comprises a supporting structure or frame which includes a top member 10, a bottom member 11 and a vertically disposed casing 12 held therebetween in any suitable manner. The top member 10 includes spaced apart horizontal walls or plates 10a and 10b, respectively, the bottom plate 10b having an opening to receive the top open end of a vertically disposed dust receptacle 14. The receptacle 14 is urged upwardly against a resilient gasket 15 in sealing relation therewith by a clamp or holding member 16 which acts resiliently against the bottom of the receptacle 14 and is fixed to the bottom frame member 11.

The resilient gasket 15, which is of annular form, constitutes the outer peripheral edge portion of a filter element or dust separating member 17 having a central opening which receives the lower end of an L-shaped conduit 18 having an inlet 19, such inlet end of the conduit being positioned in an opening formed in a side wall of a top cover 20 which serves as a protective hood for the cleaner. The dust separating member 17 is formed with circular folds 21 which are concentric with respect to one another, the points of the folds passing over top and bottom wires 22 and 23, respectively. The bottom wire 23 is held in place by elements 24 which are fixed to the top horizontal wall 10a, and the top wires 22 are fixed to and carried by a movable bridge member 25 which will be described more fully hereinafter. The innermost fold 21 is tightly secured at 26 to the lower end of the conduit 18.

To facilitate removal of dust and dirt which collects in the receptacle 14, the latter is lined with a bag 27 which may be of the throw-away type and formed of paper or other suitable material impermeable to dust. A baffle 28 is provided in the upper part of the receptacle 14 to control the movement of air and minimize movement of dust which which has collected in the receptacle, especially by eddy currents which tend to lift dust from the bottom of the receptacle. To prevent such eddying of dust particles, the central part of the baffle 28 is formed with an upwardly extending conical-shaped portion 29 which is enveloped by circular section having an upwardly sloping wall, such wall having a number of spaced apart openings 30. The extreme upper part of the receptacle 14 is slightly enlarged to receive the top folded edge of the baffle 28 which in turn receives the top edge of the bag 27, the arrangement being such that, when the receptacle 14 is maintained in position by the holding member 16, the baffle will also be maintained in position with the top folded edge thereof bearing against the resilient gasket 15.

The bottom horizontal plate 10b is also provided with an opening to receive a top closure member 31 for the casing 12, the closure member 31 being formed with an upstanding rim or collar 32. The bottom member 11, upright casing or shell 12 and top closure member 31 define a space in which the motor fan unit of the cleaner, which is diagrammatically indicated at 33, is vertically mounted in any suitable manner. In such arrangement the top closure member 31 may conveniently be employed as a bearing bracket for the motor fan unit. Air is discharged from the motor fan unit 33 at the outlet 34 located closely adjacent to the bottom member 11.

A suction hose (not shown) is adapted to be removably secured to the inlet 19 of the suction cleaner in any suitable manner. Suitable cleaning appliances may be connected to a wand which in turn is connected to the outer free end of the suction hose and through which air is drawn through conduit 18 by the motor fan unit 33. To facilitate movement of the suction cleaner when the latter is being operated, the bottom member 11 is provided with suitable wheels 35 and 36.

During operation of the suction cleaner, dust-laden air is drawn through the conduit 18 into the space 37 below the dust separating member 17 and above the baffle 28. The baffle 28 promotes reversal of the direction of air movement in space 37, and such air flows upwardly toward the dust separating member or filter element 17 which separates dust and dirt from the air. Air free of such dust and dirt passes through the dust separating member 17 and flows through a chamber 38 formed by the spaced apart plates 10a and 10b and the collar or opening 32 in the closure plate 31, such air being discharged by the motor fan unit 33 at the outlet 34.

Since dust and dirt are trapped at the bottom face or surface of the dust separating member 17, there is a tendency for the latter to become clogged during operation of the cleaner. Suitable mechanism is provided to shake and clean the dust separating member, such shaking movement imparted to the folds 21 of the dust separating member being effective to dislodge dust and dirt from the underside thereof. As best shown in Fig. 4, the dust separating member shaking mechanism includes an inverted U-shaped stirrup 39 having a top closed end 40 and side arms 41 depending downward therefrom which are arranged to act and bear against the bridge member 25. If desired, the lower end of one of the side arms 41 may be anchored at 42 to the bridge member in any suitable manner, as indicated in Fig. 4.

Figure 2:
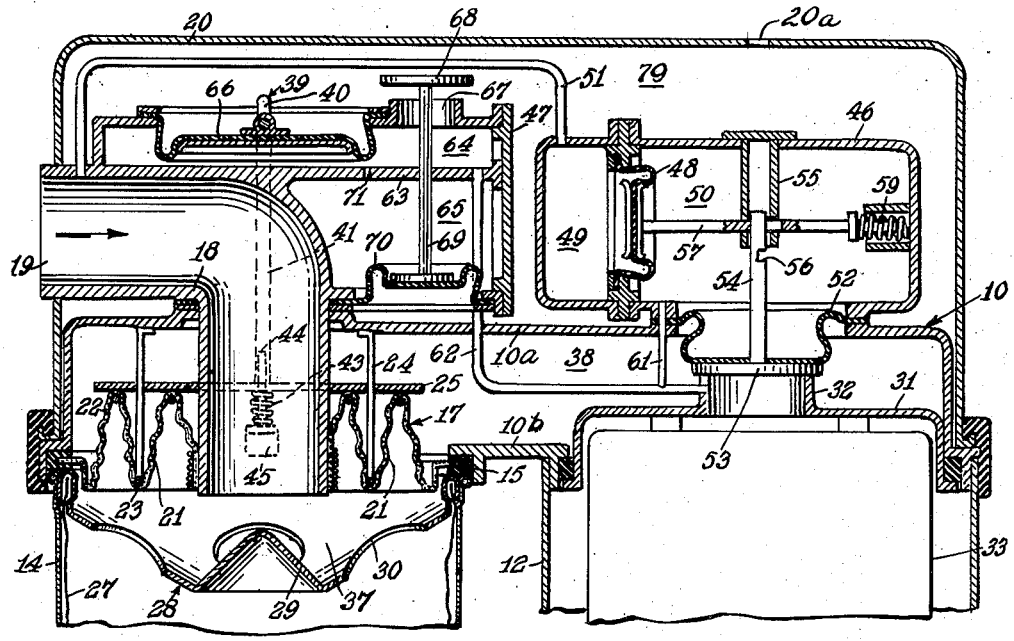
Fig. 2 is a fragmentary vertical sectional view of the top part of the suction cleaner shown in Fig. 1 to illustrate details more clearly.

The bridge member 25, which is vertically movable, is resiliently biased upwardly by a pair of springs 43, each of which is disposed about a vertical pin 44 having its lower end anchored to an angle member 45 and its upper end extending through an opening in the bridge member. When downward movement is imparted to the stirrup 39, the vertical arms 41 thereof will move the bridge member 25 downward and compress the springs 43, as best seen in Fig. 4. When the bridge member 25 is moved downward in this manner, slack is provided in the folds 21 of the dust separating member or filter 17, as best seen in Fig. 2. When downward movement is no longer imparted to the stirrup 39 and the latter is free to move upwardly, the springs 43 which are under considerable tension, are capable of imparting a quick and sudden upward movement or thrust to the filter 17, such movement of the filter snapping the individual folds 21 to dislodge dust and dirt from the underside thereof which collects in the dust bag 27 within the receptacle 14.

In accordance with my invention, shaking movement is imparted to the dust separating member 17 responsive to an operating condition which occurs when the dust separating member becomes clogged with dirt and the efficiency of the suction cleaner is reduced. In the preferred embodiment of the invention being described, fluid operated mechanism is provided to impart movement to the stirrup 39 and subsequently release the latter responsive to a predetermined pressure differential at opposite sides of the dust separating member 17 due to dust and dirt trapped at the underside thereof. Such fluid operated mechanism includes two housings 46 and 47 which are disposed underneath the protective hood 20 and carried by the top plate 10a, as seen in Figs. 1, 4 and 5.

Figure 3:
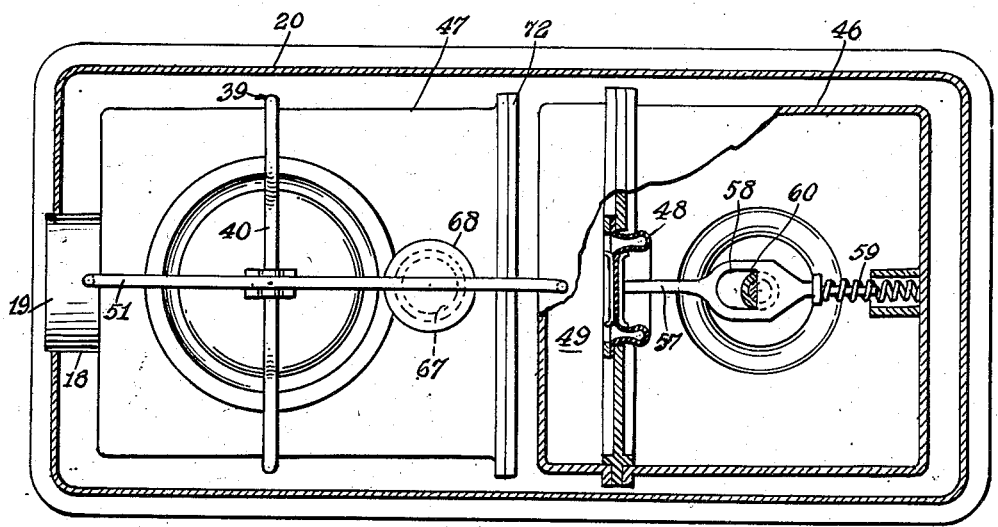
Fig. 3 is a horizontal view, partly broken away and in section, taken at line 3—3 of Fig. 1.

The housing 46 is divided by a vertically disposed partition having a movable portion or diaphragm 48 into spaces 49 and 50, the space 49 being connected by tubing 51 to the inlet end of the conduit 18, so that the space 49 will be essentially at the same pressure as the pressure at the inlet 19 and at the underside of the dust separating member 17. As shown in Fig. 1, the space 50 of housing 46 is provided with a horizontally disposed movable part or diaphragm 52 to which is fixed a valve member 53 adapted to move toward and from the rim or collar 32 which serves as a seat for such valve member. The valve member 53 is provided with a stem 54 which is vertically movable in a hollow sleeve 55 carried in the upper part of the housing 46. The valve stem 54, which is notched at 56 at a region below the extreme upper end thereof, is normally held in the raised position shown in Fig. 1 by a horizontal rod 57 fixed to and movable with the diaphragm 48. The rod 57, which is formed with an intermediate apertured portion 58 disposed about the sleeve 55, is resiliently biased towards the space 49 by a spring 59, as best shown in Fig. 3. When the valve member 53 and stem 54 are in the raised position seen in Fig. 1, the notch 56 receives the sharp straight edge portion 60 at the aperture 58 of the rod 57, the hollow sleeve 55 also being notched to allow the edge portion 60 to engage the notch 56 of the valve stem.

When the valve member 53 is in the raised or open position shown in Fig. 1, the space 50 of housing 46 is at the same pressure as the pressure in the chamber 38 into which air passes through the dust separating member 17. As shown, such communication between space 50 and chamber 38 is effected by conduits 61 and 62. Accordingly, during normal operation of the cleaner when the valve 53 is open, the pressures in spaces 49 and 50 at opposite sides of the diaphragm 48 are essentially the same as the pressures prevailing at opposite sides of the dust separating member 17. During such normal cleaner operation, dust-laden air is drawn into the inlet 19 of conduit 18. The dust and dirt are trapped at the underside of the dust separating member, and air free of such foreign matter passes into the chamber 38 and thence through the collar 32 and past motor fan unit 33 to be discharged at the outlet 34. When the dust separating member 17 is clean, the pressure differential at the opposite sides thereof is relatively small. Under these conditions, the pressure in space 50, aided by the biasing action of the spring 59, will be effective to maintain the sharp edge portion 60 of rod 57 in engagement with the notch 56 of the valve stem 54, so that the valve 53 will remain in its open position and the space 50 will be in communication with the chamber 38.

However, when the dust separating member 17 becomes clogged, due to dust and dirt trapped at the underside thereof, the pressure in space 50 will be reduced sufficiently to allow the diaphragm 48 to move against the biasing action of the spring 59, thereby causing the rod 57 to be disengaged from the notched portion 56 of the valve stem 54. Under these conditions, the valve stem 54 and valve member 53, due to force of gravity, move from the position shown in Fig. 1 to the position shown in Fig. 2. When the valve member 53 is in the closed position seen in Fig. 2, the normal flow of air through the conduit 18, dust separating member 17 and chamber 38 is stopped, the suction effect produced by the motor fan unit 33 now being effective, through conduits 61 and 62, to withdraw air from space 50 of the housing 46 to create a sub-atmospheric pressure in this space while the space 49 is at atmospheric pressure.

In accord with the invention the vacuum produced by the motor fan unit 33 is effectively employed to initiate operation of diaphragm operated mechanism embodied in the housing 47. As shown, the housing 47, which is formed integrally with the air inlet conduit 18, is divided by a horizontal partition 63 into top and bottom spaces 64 and 65, respectively; and the conduit 62, which is connected to the inlet of the motor fan unit 33 at the collar 32, is in communication with the top space 64.

The top space 64 is formed with a flexible diaphragm or movable member 66 to which is secured the closed end 40 of the inverted U-shaped stirrup 39. The housing 47, at a region immediately adjacent the diaphragm 66, is formed with an opening 67 which serves as a seat for a valve member 68 fixed to the upper end of a vertically movable stem 69. The stem 69 extends through an opening in the partition 63 and at its lower end is secured to a flexible diaphragm 70 which is provided in the bottom space 65. A small opening 71 is formed in the partition 63 so that the spaces 64 and 65 will be in restricted communication with one another. The housing 47 is also provided with an end wall 72 which is removably secured in position in any suitable manner (not shown), so that access may be had into the spaces 64 and 65, respectively.

During normal operation of the cleaner, the parts thereof are in the positions shown in Figs. 1, 4 and 5. When the pressure differential across the dust separating member 17 reaches a definite value due to clogging by dust and dirt trapped at the underside thereof, the diaphragm 48 in housing 46 becomes responsive to actuate the rod 57 and allow the valve member 53 to move downwardly by its own weight to the closed position shown in Fig. 2, as previously explained. The suction effect produced by the motor fan unit 33 now becomes effective to produce a vacuum or sub-atmospheric pressure in space 50 of housing 46, as previously explained, and also in the top space 64 of the housing 47. While the evacuation of the space 50 is effected relatively rapidly by the motor fan unit 33, the evacuation of the space 64 is effected slowly since the latter is in communication with the space 65 through the small opening 71 in the partition 63.

When the space 64 is evacuated sufficiently and the sub-atmospheric pressure therein reaches a definite value, the diaphragm 66 moves downwardly from the position shown in Figs. 1 and 4 to the position shown in Fig. 2 responsive to atmospheric pressure acting on the top surface of the diaphragm. Under these conditions the stirrup 39 is moved downwardly and the bridge member 25 becomes effective to compress the springs 43, thereby producing slack in the folds 21 of the dust separating member 17, as shown in Fig. 2 and described above. When this occurs the valve 68 in the housing 47 is still in its closed position, as seen in Fig. 1. However, air continues to be withdrawn from both of the spaces 64 and 65 by the suction effect produced by the motor fan unit 33, the air withdrawn from the space 65 passing into the space 64 through the restricted or fine opening 71 in the partition 63.

Space 79 is at atmospheric pressure by reason of the opening 20a in the top cover 20, as shown in Figs. 1, 2 and 5, and when the pressure in the bottom space 65 becomes sufficiently reduced, the valve member 68 is moved upwardly from the seat 67 responsive to the atmospheric pressure in space 79 acting against the underside of the diaphragm 70. In other words, atmospheric pressure in the space 79 acting against the diaphragm 70 eventually becomes effective to overcome the weight of the valve 68 and stem 69 and also the counteracting atmospheric pressure tending to maintain the valve member 68 in its closed position. Accordingly, the effective cross-sectional areas of the diaphragm 70 and the valve member 68 are such that, when the sub-atmospheric or partial vacuum in the space 65 reaches a definite value, the total pressure acting on the underside of the diaphragm 70 will be effective to overcome the weight of the valve member 68 and stem 69 and also the total counteracting pressure acting downwardly on the top surface of the valve member 68.

With the valve member 68 now in the raised or open position shown in Fig. 2, the space 64 is immediately at atmospheric pressure and hence both sides of the diaphragm 66 are subjected to the same pressure. Accordingly, the diaphragm 66 is no longer effective to hold down the stirrup 39 and the springs 43 become operable to impart a quick and sudden upward thrust or movement to the dust separating member 17, thereby snapping the folds 21 to dislodge dust and dirt from the underside thereof in the manner explained above.

When the valve member 68 is raised to its open position, atmospheric air can also pass through the opening 71 in partition 63 into the bottom space 65 of the housing 47, thereby increasing the pressure in the space 65. When the pressure differential at opposing sides of the diaphragm 70 reaches a definite low value, the weight of the valve member 68 and stem 69 overcomes the effective upwardly acting pressure on this diaphragm, thereby allowing the valve member 68 to move to its closed position on the seat 67. When this occurs, the space 64 again will be evacuated due to withdrawal of air therefrom through conduit 62 by the motor fan unit 33. In this way, the shaking mechanism for the dust separating member 17 will again be operated pneumatically, such operation being repeated in the manner just explained.

During the period when the shaking mechanism for the dust separating member 17 is being operated, space 50 of the housing 46 is being evacuated by withdrawal of air therefrom through the conduits 61 and 62. The vacuum that ultimately can be produced in the space 50 may be referred to as being equivalent to "zero vacuum," that is, the degree of vacuum capable of being produced by the motor fan unit 33 when the suction line is completely closed or shut off. After the dust separating member 17 has been shaken a number of times and the sub-atmospheric pressure in the space 50 has reached a definite low value, upward movement is imparted to valve member 53 and stem 54.

This is so because, while the top face or side of the diaphragm 52 and the underside of the valve member 53 are subjected to the same sub-atmospheric pressure, the area of the top face of the diaphragm is considerably larger than that of the underside of the valve member 53 when it is seated on the collar 32. Also, since the region of the diaphragm 52 extending radially outward from the valve member 53 when the latter is seated on the collar 32 will be subjected to the atmospheric pressure in the space 38, upward movement of the diaphragm 52 is further promoted.

Hence, when upward movement of valve member 53 and stem 54 is effected, the pressure in the space 50 will again be sufficiently high so that the pressure prevailing in this space, aided by the spring 59, will be effective to hold the valve member 53 in the raised or open position seen in Fig. 1. Under these conditions normal operation of the cleaner is resumed in which air is drawn into the inlet 19 of conduit 18, and, after passing through the dust separating member 17, flows through the chamber 38 and motor fan unit 33 and is discharged at the outlet 34. During such normal operation of the cleaner, the diaphragm or movable member 66 is unaffected by the "full" suction effect produced by the motor fan unit 33 during normal circulation of air in its path of flow between the inlet 19 and outlet 34. When the dust separating member 17 again becomes clogged with dust and dirt at the underside thereof and the pressure differential at opposite sides of the diaphragm 48 once more reaches a definite value, the rod 57 is then caused to move again and release the stem 54 of valve member 53 to allow the latter to move to its closed position and instigate operation of the pneumatic or fluid operated mechanism for mechanically shaking the dust separating member 17 in the manner explained above.

In Fig. 6 I have shown a modification of the fluid operated mechanism for shaking the dust separating member 17. In Fig. 6 the housing 47' is formed integrally with the suction inlet conduit 18' into which air is drawn in at the inlet 19'. The housing 47' is similar to the housing 47 described above in that a partition 63' having a restricted opening 71' defines the top and bottom spaces 64' and 65', respectively. The diaphragm 66' is provided for the top space 64' and the diaphragm 70' is provided for the bottom space 65', the diaphragm 70' being connected to the stem 69' of the valve member 68' having a seat 67' in the top space 64'.

In the modification of Fig. 6, the housing 47' is provided with a space 73 above the diaphragm 66', the latter being connected to a link 74 which extends upwardly through an opening in the top wall 75 of the space 73 and is secured at its upper end to the stirrup 39. The top wall of the chamber 64' is formed with a restricted opening 76, and the valve stem 69' projects upwardly through the space 73 and is provided with a valve member 77 having a cooperating seat 78 in the top wall 75 of the housing.

The operation of the diaphragm operated mechanism of Fig. 6 is essentially the same as that of the first-described embodiment. However, in the embodiment of Fig. 1 a downwardly directed force acts at all times on the diaphragm 66 and also on the dust separating member 17 during normal operation of the cleaner, such downwardly directed force being dependent upon the vacuum or suction effect developed at the underside of the dust separating member 17. Accordingly, the folds 21 of the dust separating member 17 are not always fully stretched in the first-described embodiment of the invention. By providing the modification shown in Fig. 6 and just described, the diaphragm 66' during normal operation of the cleaner is always subjected at both sides thereof to the same pressure. In this way the diaphragm 66' is free of any forces during normal operation of the cleaner tending to interfere with the fully stretched out position of the folds 21 of the dust separating member 17.

In view of the foregoing, it will now be understood that I have provided an improved fluid operated mechanism for automatically shaking the suction cleaner filter element 17, the operation of the mechanism being initiated by the pressure differential at opposite sides of the filter element. After the valve member 53 moves from the position shown in Fig. 1 to the position illustrated in Fig. 2, the normal circulation of air through the suction cleaner is stopped and the flow of air from the filter element 17 to the suction inlet 32 of the motor fan unit 33 is temporarily shut off.

With the valve member 53 in its closed or seated position, the suction effect developed by the motor fan unit 33 is effectively employed to put the filter element shaking mechanism into operation. This mechanism, which includes the diaphragm operated motor embodied in the housing 47, stirrup 39, bridge member 25 and springs 43, imparts several thrusts or snapping movements in succession to the filter element 17. After the dust and dirt are dislodged from the filter element in this manner, the valve member 53 agains moves to its open position in Fig. 1 and normal circulation of air through the cleaner again takes place automatically. Hence, during the interval of time the filter element 17 is being shaken, there is no circulation of air in the upper part of the receptacle 14 through the filter element toward the suction inlet of the motor fan unit.

Although I have shown and described several embodiments of my invention, I do not wish to be limited to the particular arrangements set forth, and I intend in the following claims to cover all modifications which do not depart from the spirit and scope of my invention.

What is claimed is:

1. In a suction cleaner having a casing provided with an inlet and an outlet, a motor fan unit for normally circulating air in a path of flow between the inlet and outlet, a movable filter element in the path of flow for removing dust from air which passes therethrough, a member movable between first and second positions, means connecting said member and said filter element, said member being unaffected by the full suction effect produced by said motor fan unit during normal circulation of air in its path of flow between the inlet and outlet, means including said filter element when clogged with dust to produce an operating condition which reduces the efficiency of the cleaner, means responsive to said operating condition for subjecting one side of said member to the suction effect produced by said motor fan unit to cause said member to move from its first to its second position and effect movement of said filter element in one direction, and means operable to move said member from its second to its first position and effect movement of said filter element in the opposite direction.

2. In a suction cleaner having a casing provided with an inlet and an outlet, a motor fan unit for normally circulating air in a path of flow between the inlet and outlet, a movable filter element in the path of flow for removing dust from air which passes therethrough, a member movable between first and second positions, means connecting said member and said filter element, means for biasing said member to its first position, said member being unaffected by the full suction effect produced by said motor fan unit during normal circulation of air in its path of flow between the inlet and outlet, means including said filter element when clogged with dust to produce an operating condition which reduces the efficiency of the cleaner, means responsive to said operating condition for subjecting one side of said member to the suction effect produced by said motor fan unit to cause said member to move from its first to its second position against the action of said biasing means and effect movement of said filter element in one direction, and means operable to move said member from its second to its first position with the aid of said biasing means and effect movement of said filter element in the opposite direction.

3. In a suction cleaner having a casing provided with an inlet and an outlet, a motor fan unit for normally circulating air in a path of flow between the inlet and outlet, a movable filter element in the path of flow for removing dust from air which passes therethrough, a member movable between first and second positions, means connecting said member and said filter element, means for biasing said member to its first position, said member being unaffected by the full suction effect produced by said motor fan unit during normal circulation of air in its path of flow between the inlet and outlet, means including said filter element when clogged with dust to produce an operating condition which reduces the efficiency of the cleaner, means responsive to said operating condition for subjecting one side of said member to the suction effect produced by said motor fan unit to cause said member to move from its first to its second position at a first rate of speed against the action of said biasing means and effect movement of said filter element in one direction, and means operable to move said member from its second to its first position at a second higher rate of speed with the aid of said biasing means and effect movement of said filter element in the opposite direction at a faster rate than when movement thereof is effected in the one direction.

4. In a suction cleaner having a casing provided with an inlet and an outlet, a motor fan unit for normally circulating air in a path of flow between the inlet and outlet, a movable filter element in the path of flow for removing dust from air which passes therethrough, the region into which air passes through said filter element being subjected to the suction effect produced by said motor fan unit, a member movable between first and second positions, means connecting said member and said filter element, said member being unaffected by the full suction effect produced by said motor fan unit during normal circulation of air in its path of flow between the inlet and outlet, means including said filter element when clogged with dust to produce an operating condition which reduces the efficiency of the cleaner, means responsive to said operating condition to reduce the extent to which said region at one side of said filter element is subjected to the suction effect produced by said motor fan unit and increase the extent to which one side of said member is subjected to such suction effect to cause said member to move from its first to its second position and effect movement of said filter element in one direction, and means operable to move said member from its second to its first position and effect movement of said filter element in the opposite direction.

5. In a suction cleaner having a casing provided with an inlet and an outlet, a motor fan unit for normally circulating air in a path of flow between the inlet and outlet, a movable filter element in the path of flow for removing dust from air which passes therethrough, a member movable between first and second positions, means connecting said member and said filter element, means for biasing said member to the first position, said member being unaffected by the full suction effect produced by said motor fan unit during normal circulation of air in its path of flow between the inlet and outlet, means including said filter element when clogged with dust to produce an operating condition which reduces the efficiency of the cleaner, first means responsive to said operating condition for subjecting one side of said member to the suction effect produced by said motor fan unit to cause said member to move from its first to its second position against the action of said biasing means and effect movement of said filter element in one direction, and additional means responsive to said operating condition to reduce the extent to which the one side of said member is subjected to the suction effect produced by said motor fan unit and render said biasing means operable to move said member from its second to its first position and effect movement of said filter element in the opposite direction.

6. Apparatus as set forth in claim 5 in which slack is produced in said filter element when movement thereof is effected in the one direction with movement of said member from its first to its second position, said biasing means being resilient in character and capable of imparting a quick and sudden movement to said filter element to snap the latter and dislodge dust therefrom when it is rendered operable to move said member from its second to its first position and effect movement of said filter element in the opposite direction to the one direction.

7. In a suction cleaner having a casing provided with an inlet and an outlet, a motor fan unit for circulating air in a path of flow between the inlet and outlet, a movable filter element in the path of flow for removing dust from air which passes therethrough, a first region of said path of flow into which air passes through said filter element being subjected to the suction effect produced by said motor fan unit during normal operation of the cleaner, structure providing a second region which includes a member defining a wall part thereof, said member being movable between first and second positions, means connecting said member and said filter element, means including said filter element when clogged with dust to produce an operating condition which reduces the efficiency of the cleaner, first means responsive to said operating condition for transferring the suction effect produced by said motor fan unit from said first region to said second region to cause said member to move from its first to its second position and effect movement of said filter element in one direction, and second means for intermittently reducing the extent to which said second region is influenced by the suction effect produced by said motor fan unit to cause said member to move from its second to its first position and effect movement of said filter element in the opposite direction, said member, when said last-mentioned means becomes ineffective to reduce the extent to which said second region is influenced by the suction effect produced by said motor fan unit, again becoming operable responsive to the suction effect produced in such second region to move from its first position to its second position and effect movement of said filter element in the one direction.

8. Apparatus as set forth in claim 7 in which said first means, which is responsive to said operating condition, includes structure for rendering said second region subject to the influence of the suction effect produced by said motor fan unit even when the influence of such suction effect at said second region is reduced by said second means.

9. Apparatus as set forth in claim 8 which includes means for biasing said member to its first position, said member moving from its first position to its second position responsive to the suction effect produced at said second region by said motor fan unit against the action of said biasing means, said member moving from its second to its first position with the aid of said biasing means when said second means reduces the extent to which said second region is influenced by the suction effect produced by said motor fan unit.

10. Apparatus as set forth in claim 7 in which said second means becomes operable to reduce the extent to which said second region is influenced by the suction effect of said motor fan unit after said member has moved from its first to its second position.

11. Apparatus as set forth in claim 7 in which said second means becomes operable responsive to the suction effect produced by said motor fan unit.

12. In a suction cleaner having a casing provided with an inlet and an outlet, a motor fan unit for circulating air in a path of flow between the inlet and outlet, a movable filter element in the path of flow for removing dust from air which passes therethrough, a first region of said path of flow into which air passes through said filter element being subjected to the suction effect produced by said motor fan unit during normal operation of the cleaner, structure providing a second region which includes a member defining a wall section thereof, conduit means connecting said second region and the suction inlet of said motor fan unit, said member being movable between first and second positions, means connecting said member and said filter element, means including said filter element when clogged with dust to produce an operating condition which reduces the efficiency of the cleaner, first means responsive to said operating condition for transferring the suction effect produced by said motor fan unit from said first region to said conduit means and second region communicating therewith, said member, when the suction effect produced by said motor fan unit is transferred to said second region, being movable from its first to its second position and effecting movement of said filter element in one direction, and second means for intermittently establishing communication between said second region and the atmosphere to cause said member to move from its second to its first position and effect movement of said filter element in the opposite direction, said member, when said second means becomes ineffective to establish communication between said second region and the atmosphere, again becoming operable responsive to the suction effect produced in such second region to move from its first position to its second position and effect movement of said filter element in the one direction.

13. Apparatus as set forth in claim 12 in which said second means comprises structure providing a third region in restricted communication with said second region, such third region including a second movable member forming a wall section thereof, said second region having an opening in a wall section thereof, valve means for closing such opening, and means for controlling said valve means responsive to said second movable member.

14. Apparatus as set forth in claim 12 in which said first means comprises a part movable responsive to said operating condition, a valve member which is movable responsive to movement of said part and disposed at a place in the path of flow between said first region and the suction inlet of said motor fan unit for controlling flow of air, said conduit means communicating with the suction inlet of said motor fan unit when said valve member is in its closed position.

15. Apparatus as set forth in claim 14 in which said valve member is carried by said part.

16. Apparatus as set forth in claim 15 in which said first means further comprises structure providing a first space in which said part forms a wall section thereof, the outer face of said part being disposed in the path of flow and subject to the suction pressure produced by said motor fan unit when said valve member is in its closed position, and conduit means to establish communication between said first space and the suction inlet of said motor fan unit when said valve member is in its closed position.

17. Apparatus as set forth in claim 16 in which said structure forming said first means provides said first space and also a second space and a partition therebetween, a movable portion forming a section of said partition, said second space being in communication with the path of flow at a region between the inlet and said filter element, and means responsive to movement of said portion of said partition and said part for controlling said valve member.

References Cited in the file of this patent

UNITED STATES PATENTS

| | | |
|---|---|---|
| 2,320,368 | Leathers | June 1, 1943 |
| 2,591,567 | Lofgren et al. | Apr. 1, 1952 |
| 2,633,206 | Bruckner | Mar. 31, 1953 |
| 2,645,303 | Meyerhoefer | July 14, 1953 |

FOREIGN PATENTS

| | | |
|---|---|---|
| 868,286 | France | Sept. 22, 1941 |